United States Patent
Kehr et al.

[15] 3,653,959
[45] Apr. 4, 1972

[54] ENCAPSULATING AND POTTING COMPOSITION AND PROCESS

[72] Inventors: Clifton L. Kehr, Silver Spring; Walter R. Wszolek, Sykesville, both of Md.

[73] Assignee: W. R. Grace & Co.

[22] Filed: Apr. 14, 1970

[21] Appl. No.: 28,510

Related U.S. Application Data

[63] Continuation-in-part of Ser. No. 617,801, Feb. 23, 1967, abandoned.

[52] U.S. Cl. ..........................117/201, 117/232, 117/212, 117/93.31, 260/79, 260/79.7, 264/272, 260/79.1
[51] Int. Cl. ................................................................B29c 6/00
[58] Field of Search .............117/201, 232, 93.31; 260/830, 260/79, 79.1

[56] References Cited

UNITED STATES PATENTS 3,505,258  4/1970  Panek et al. .....................260/79.1 X
3,472,913  10/1969  Ephraim ..............................260/830

OTHER PUBLICATIONS

Thiokol Corporation "Thiokol LP-Z"

*Primary Examiner*—Ralph S. Kendall
*Attorney*—Richard P. Plinkett and Kenneth E. Prince

[57] ABSTRACT

This invention relates to encapsulating by, molding, embedding, casting, impregnating, potting and encasing various components, e.g., decorative, electric, electronic and microelectronic components using a composition which is preferably transparent comprising (1) a liquid polyene containing at least two reactive unsaturated carbon to carbon bonds per molecule and (2) a polythiol containing at least two thiol groups per molecule, the total combined functionality of (a) the reactive unsaturated carbon to carbon bonds per molecule in the polyene and (b) the thiol groups per molecule in the polythiol being greater than four, which composition, with the aforesaid components therein, can be cured under ambient conditions in the presence of a free radical generator to a solid, elastomeric or resinous product.

8 Claims, No Drawings

ENCAPSULATING AND POTTING COMPOSITION AND PROCESS

This application is a continuation-in-part of our copending application having Ser. No. 617,801 filed Feb. 23, 1967 now abandoned.

In the encapsulating field today, various resins are employed for such use. Such resins include unsaturated polyesters, silicones, fluorocarbons, isocyanate resins, and epoxy resins. While no one resin meets all the requirements of this group, the epoxy resins are employed most widely throughout the field. However, even the epoxy have certain drawbacks. For instance, epoxy resins have a high pouring viscosity and thus for penetration of articles such as wire coils it is necessary to use reactive diluents which have an adverse effect on solvent and heat resistance. Additionally, when the epoxy resins are cured at low temperature, they have a short pot life. The fastest amine hardeners are also the most likely to irritate sensitive skins before the hardener is reacted with the epoxy in the curing reaction. To improve the toughness of epoxy resins they are reacted with polysulfide, polyamide or flexibilizing amines. However, this causes a sacrifice of heat resistance and electrical characteristics. To improve the electrical properties the epoxy resins are preferably cured with anhydride hardeners as compared with the amines. Such anhydride hardeners however, require high temperature cures.

One object of the instant invention is to produce an encapsulating composition which has a stable pot life. Another object of the instant invention is to produce an encapsulating composition which will cure at ambient temperatures. Still another object of the instant invention is to produce an encapsulating composition which is essentially non-toxic to the personnel using same. A further object of the instant invention is to produce an encapsulating composition which contains substantially no solvents or other unreactive diluents. Yet another object of the instant invention is to produce an encapsulating composition which has no appreciable volume shrinkage on curing. A further object of the instant invention is to produce an encapsulating composition which, upon curing, has good adhesion to various materials. A still further object of the instant invention is to produce an encapsulating composition which, upon curing, is in the preferred case transparent, and has outstanding resistance to reversion under conditions of high temperatures and high humidity.

The aforesaid and other objects are obtained by forming a composition comprising (1) a liquid polyene containing at least two reactive unsaturated carbon to carbon bonds per molecule and (2) a polythiol containing at least two thiol groups per molecule, the total combined functionality of (a) the reactive unsaturated carbon to carbon bonds per molecule in the polyene and (b) the thiol groups per molecule in the polythiol being greater than four, which composition with decorative, electric, electronic or microelectronic components therein, is cured under ambient conditions in the presence of a free radical generator to a solid, elastomeric or resinous product. In the preferred instance for encapsulating where the free radical generator is actinic radiation, e.g., UV light, a curing rate accelerator in an amount ranging from 0.0005 to 50 percent by weight of said composition is added to the composition.

It is possible by the employment of the composition of the instant invention to carry out such processes as embedment, casting, molding, potting or impregnation which processes will all be referred to as encapsulating processes herein and will be shown by examples hereinafter.

The crucial ingredients in the preferred photocurable composition of the instant invention are:

1. about 2 to about 98 parts by weight of a polyene containing two or more reactive unsaturated carbon to carbon bonds per molecule;
2. about 98 to about 2 parts by weight of a polythiol containing at least two thiol groups per molecule; and
3. about 0.0005 to about 50 parts by weight (based on 100 parts by weight of (1) and (2) of a photocuring rate accelerator.

It is to be understood, however, that when energy sources other than visible or ultraviolet light are used to initiate the curing reaction, photocuring rate accelerators (i.e., photosensitizers, etc.) generally are not required in the formulation. That is to say, the actual composition of the curable composition may vary with the type of energy source that is used to initiate the curing reaction.

The reactive carbon-to-carbon bonds of the polyenes are preferably located terminally, near terminally, and/or pendant from the main chain. The polythiols, preferably, contain two or more thiol groups per molecule. The photocurable compositions are liquid (i.e., flowable) over the temperature range provided during the application.

Methods of preparing various polyenes, with the limitations set forth herein, useful within the scope of this invention are disclosed in copending application, Ser. No. 674,773, filed Oct. 12, 1967 now abandoned and assigned to the same assignee. Some of the useful polyenes are prepared in the detailed examples set forth in the following specification. The general formulas for several useful representative polyenes and polyynes are given in the figure in Dutch (Holland) application No. 67/10439 which was laid open to public inspection and copying thereof on Jan. 29, 1968 (said pertinent portions of said public document being incorporated herein by reference).

The polythiols and one group of operable polyenes which can be cured rapidly by the practice of the instant invention are set out in a copending application assigned to the same assignee having Ser. No. 617,801 filed Feb. 23, 1967 and are incorporated herein by reference. That is, one group of polyenes operable in the instant invention are those having a molecular weight in the range 50 to 20,000, a viscosity ranging from 0 to 20 million centipoises at 70° C. of the general formula: $(A — (X)_m$ wherein X is a member of the group consisting of

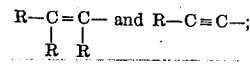

$m$ is at least 2; R is independently selected from the group consisting of hydrogen, halogen, aryl, substituted aryl, cycloalkyl, aralkyl, substituted arylkyl and alkyl and substituted alkyl groups containing one to 16 carbon atoms and A is a polyvalent organic moiety free of (1) reactive carbon to carbon unsaturated and (2) unsaturated groups in conjunction with the reactive ene or yne groups in X. Thus A may contain cyclic groupings and minor amounts of hetero atoms such as N, S, P, or O but contains primarily carbon-carbon, carbon-oxygen or silicon-oxygen containing chain linkages without any reactive carbon to carbon unsaturation.

Examples of said operable polyenes include, but are not limited to 1. crotyl-terminated polyurethanes which contain two "reactive" double bonds per average molecule in the near terminal position of the average general formula:

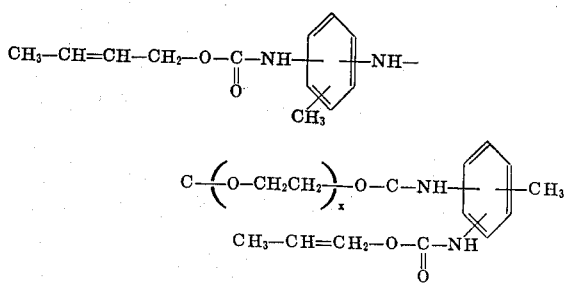

where $x$ is at least 1, 2. ethylene/propylene/non-conjugated diene terpolymers, such as "Nordel 1040" manufactured by duPont which contains pendant "reactive" double bonds of the formula:

$$-CH_2-CH=CH-CH_3,$$

3. the following structure which contains terminal "reactive" double bonds:

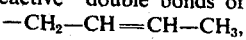

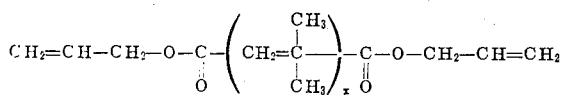

where x is at least 1, 4. the following structure which contains near terminal "reactive" double bonds

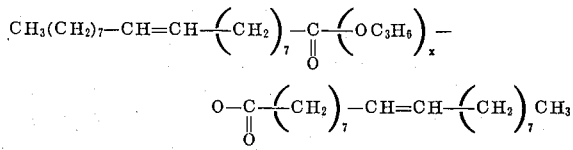

where x is at least 1.

As used herein polyenes and polyynes refer to simple or complex species of alkenes or alkynes having a multiplicity of pendant, terminally positioned "reactive" carbon to carbon unsaturated functional groups per average molecule. For example, a diene is a polyene that has two "reactive" carbon to carbon double bonds per average molecule, while a diyne is a polyyne that contains in its structure two "reactive" carbon to carbon triple bonds per average molecule. Combinations of "reactive" double bonds and "reactive" triple bonds within the same molecule are also possible. An example of this is monovinylacetylene, which is a polyeneyne under our definition. For purposes of brevity all these classes of compounds will be referred to herein as polyenes.

A second group of polyenes operable in the instant invention includes unsaturated polymers in which the double or triple bonds occur primarily within the main chain of the molecules. Examples include conventional elastomers (derived primarily from standard diene monomers) such as polyisoprene, polybutadiene, styrene-butadiene rubber, isobutylene-isoprene rubber, polychloroprene, styrene-butadiene-acrylonitrile rubber, and the like; unsaturated polyesters, polyamides, and polyurethanes derived from monomers containing "reactive" unsaturation, e.g., adipic acid-butenediol, 1,6-hexanediamine-fumaric acid and 2,4-tolylene diisocyanate-butenediol condensation polymers and the like.

A third group of polyenes operable as part of the composition in this invention includes those polyenes in which the reactive unsaturated carbon to carbon bonds are conjugated with adjacent unsaturated groupings. Examples of operable reactive conjugated ene systems include, but are not limited to the following:

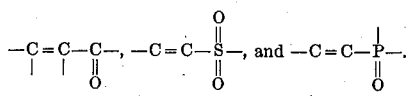

A few typical examples of polymeric polyenes which contain conjugated reactive double bond groupings such as those described above are polyethyleneether glycol diacrylate having a molecular weight of about 750, polytetramethyleneether glycol dimethacrylate having a molecular weight of about 1,175, the triacrylate of the reaction product of trimethylolpropane with 20 moles of ethylene oxide, and the like.

Another group of polyenes operable as part of the encapsulating compositions having an -ene or -yne functionality of at least two are formed by reacting either a. An organic epoxide containing at least two

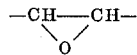

groups in its structure with a member of the group consisting of hydrazine, primary amines, secondary amines, tertiary amine salts, organic alcohols and organic acids wherein said group members contain at least one organic substituent containing a reactive ethylenically or ethynylically unsaturated group, or b. An organic epoxide containing at least one organic substituent containing a reactive ethyleneically or ethynylically unsaturated group with a member of the group consisting active hydrogen functions from the group consisting of

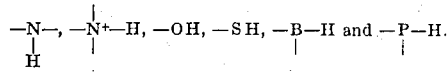

As used herein for determining the position of the reactive functional carbon to carbon unsaturation, the term "terminal" means that said functional unsaturation is at an end of the main chain in the molecule; whereas by "near terminal" is meant that the functional unsaturation is not more than 16 carbon atoms away from an end of the main chain in the molecule. The term "pendant" means that the reactive carbon to carbon unsaturation is located terminally or near terminally in a branch of the main chain as contrasted to a position at or near the ends of the main chain. For purposes of brevity all of these positions will be referred to generally as "terminal" unsaturation.

The liquid polyenes operable in the first group of polyenes described above in the instant invention contain one or more of the following types of non-aromatic and non-conjugated "reactive" carbon to carbon unsaturation:

(1) 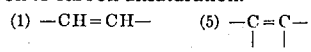   (5) —C=C—
                                              | |

(2) —C≡C—                  (6) —C=CH—
                                              |

(3) —CH=CH₂              (7) —CH=C—
                                              |

(4) —C≡CH                  (8) —C=CH₂
                                              |

These functional groups as shown in 1–8 supra are situated in a position either which is pendant, terminal or near terminal with respect to the main chain but are free of terminal conjugation. As used herein the phrase "free of terminal conjugation" means that the terminal "reactive" unsaturated groupings may not be linked directly to non-reactive unsaturated species such as:

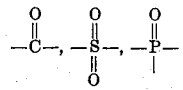

and the like so as to form a conjugated system of unsaturated bonds exemplified by the following structure:

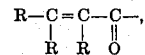

etc. On the average, the polyenes must contain two or more "reactive" unsaturated carbon to carbon bonds/molecule and have a viscosity in the range from 0 to 20 million centipoises at 70° C. Included in the term "polyenes" as used herein are those materials which in the presence of an inert solvent, aqueous dispersion or plasticizer fall within the viscosity range set out above at 70° C. Operable polyenes in the instant invention have molecular weights in the range 50–20,000, preferably 500 to 10,000.

As used herein the term "reactive" unsaturated carbon to carbon groups means groups having the structures as shown in 1–8 supra which will react under proper conditions as set forth herein with thiol groups to yield the thioether linkage

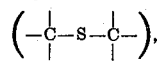

as contrasted to the term "unreactive" carbon to carbon unsaturation which means

groups when found in aromatic nucleii (cyclic structures exemplified by benzene, pyridine, anthracene, and the like) which do not under the same conditions react with thiols to give thioether linkages. In the instant invention, cured encapsulated products from the reaction of polyenes with polythiols which contain two or more thiol groups per average molecule are called polythioether polymers or polythioethers.

As used herein, the term polythiols refers to simple or complex organic compounds having a multiplicity of pendant or terminally positioned —SH functional groups per average molecule.

On the average the polythiols must contain two or more —SH groups/molecule. They usually have a viscosity range of 0 to 20 million centipoises (cps) at 70° C. as measured by a Brookfield Viscometer. Included in the term "polythiols" as used herein are those materials which in the presence of an inert solvent, aqueous dispersion or plasticizer fall within the viscosity range set out above at 70° C. Operable polythiols in the instant invention usually have molecular weights in the range 50–20,000, preferably 100–10,000.

The polythiols operable in the instant invention can be exemplified by the general formula: $R_8$—$(SH)_n$ where $n$ is at least 2 and $R_8$ is a polyvalent organic moiety. Thus $R_8$ may contain cyclic groupings and minor amounts of hetero atoms such as N, S, P or O but primarily contains carbon-hydrogen, carbon-oxygen, or silicon-oxygen containing chain linkages.

One class of polythiols operable with polyenes in the instant invention to obtain a cured polythioether is esters of thiol-containing acids of the general formula: HS—$R_9$—COOH where $R_9$ is an organic moiety with polyhydroxy compounds of the general structure: $R_{10}$—$(OH)_n$ where $R_{10}$ is an organic moiety and $n$ is 2 or greater. These components will react under suitable conditions to give a polythiol having the general structure:

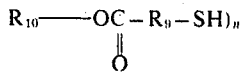

where $R_9$ and $R_{10}$ are organic moieties and $n$ is 2 or greater.

Certain polythiols such as the aliphatic monomeric polythiols (ethane dithiol, hexamethylene dithiol, decamethylene dithiol, tolylene-2,4-dithiol, etc. and some polymeric polythiols such as a thiol-terminated ethylcyclohexyl dimercaptan polymer, etc. and similar polythiols which are conveniently and ordinarily synthesized on a commercial basis, although having obnoxious odors, are operable in this invention but many of the end products are not widely accepted from a practical, commercial point of view. Examples of the polythiol compounds preferred for this invention because of their relatively low odor level include, but are not limited to, esters of thioglycolic acid (HS—CH$_2$COOH), α-mercaptopropionic acid (HS—CH(CH$_3$)—COOH and β-mercaptopropionic acid (HS—CH$_2$CH$_2$COOH) with polyhydroxy compounds such as glycols, triols, tetraols, pentaols, hexaols, etc. Specific examples of the preferred polythiols include, but are not limited to, ethylene glycol bis (thioglycolate), ethylene glycol bis (β-mercaptopropionate), trimethylol-propane tris (thioglycolate), trimethylolpropane tris (β-mercaptopropionate), pentaerythritol tetrakis (thioglycolate), tris (hydroxyethyl) isocyanurate tris (β-mercaptopropionate) and pentaerythritol tetrakis (β-mercaptopropionate), most of which are commercially available. A specific example of a preferred polymeric polythiol is polypropylene ether glycol bis (β-mercaptopropionate) which is prepared from polypropylene ether glycol (e.g., Pluracol P2010, Wyandotte Chemical Corp.) and β-mercaptopropionic acid by esterification.

The preferred polythiol compounds are characterized by a low level of mercaptan-like odor initially, and after reaction, give essentially odorless end products which are commercially attractive and practically useful resins or elastomers for both indoor and outdoor application.

Other operable polythiols include tris (2-hydroxyethyl) isocyanurate tris (3-mercaptopropionate), tris (2-thiocarboxyethyl) isocyanurate, tris (2-mercaptoethyl) isocyanurate, tris (2-mercaptoethoxyethyl) isocyanurate and the like.

The term "functionality" as used herein refers to the average number of ene or thiol groups per molecule in the polyene or polythiol, respectively. For example, a triene is a polyene with an average of three "reactive" carbon to carbon unsaturated groups per molecule and thus has a functionality ($f$) of three. A dithiol is a polythiol with an average of two thiol groups per molecule and thus has a functionality ($f$) of two.

It is further understood and implied in the above definitions that in these systems, the functionality of the polyene and the polythiol component is commonly expressed in whole numbers although in practice the actual functionality may be fractional. For example, a polyene component having a nominal functionality of two (from theoretical considerations alone) may in fact have an effective functionality of somewhat less than two. In an attempted synthesis of a diene from a glycol in which the reaction proceeds to 100 percent of the theoretical value for complete reaction, the functionality (assuming 100 percent pure starting materials) would be two. If however, the reaction were carried to only 90 percent of theory for complete reaction, about 10 percent of the molecules present would have only one ene functional groups, and there may be a trace of materials that would have no ene functional groups at all. Approximately 90 percent of the molecules, however, would have the desired diene structure and the product as a whole would then have an actual functionality of 1.9. Such a product is useful as an encapsulant for electrical components in the instant invention and is referred to herein as having a functionality of two.

The aforesaid polyenes and polythiols, can if desired, be formed or generated in situ and still be rapidly cured by the process of the instant invention.

To obtain the maximum strength, solvent resistance, creep resistance, heat resistance and freedom from tackiness, the reactive components consisting of the polyene and polythiol (in combination with a curing rate accelerator when visible or UV light is the free radical generator) are formulated in such a manner as to give solid, crosslinked, three dimensional network polythioether polymer systems on curing. In order to achieve such infinite network formation the individual polyenes and polythiols must each have a functionality of at least two and the sum of the functionalities of the polyene and polythiol components must always be greater than four. Blends and mixtures of the polyenes and the polythiols containing said functionality are also operable herein.

The encapsulating compositions to be cured, i.e., (converted to solid resins or elastomers) in accord with the present invention are preferably transparent but may, if desired, include such additives as antioxidants, accelerators, dyes, inhibitors, activators, fillers, pigments, anti-static agents, flame-retardant agents, thickeners, thixotropic agents, surface-active agents, viscosity modifiers, extending oils, plasticizers, tackifiers thermally activated color changing agents and the like within the scope of this invention. Such additives are usually preblended with the polyene or polythiol prior to or during the compounding step. Operable fillers include natural and synthetic resins, carbon black, glass fibers, wood flour, mica flour, clay, silica, alumina, carbonates, oxides, hydroxides, silicates, glass flakes, glass beads, borates, phosphates, diatomaceous earth, talc, kaolin, barium sulfate, calcium sulfate, calcium carbonate, antimony oxide sand and the like. The aforesaid additives may be present in quantities up to 500 parts per 100 parts of the polyene-polythiol compositions by weight and preferably 0.005–300 parts on the same basis.

In all the curable encapsulating systems herein, the compositions consist of 2 to 98 parts by weight of a polyene containing at least two reactive unsaturated carbon to carbon bonds per molecule and 98 to 2 parts by weight of a polythiol containing at least two thiol groups per molecule. If a photocuring rate accelerator is used, it is present in an amount ranging from 0.0005 to 50 parts by weight of the polyene-polythiol composition.

Various curing rate accelerators are operable when using UV light in the instant invention. Examples of curing rate accelerators e.g., UV absorbers and sensitizers include but are not limited to benzophenone, acetophenone, acenaphthenequinone, methyl ethyl ketone, valerophenone, hexanophenone, γ-phenylbutyrophenone, p- morpholinopropiophenone, dibenzosuberone, 4-morpholinobenzophenone, 4'-morpholinode-oxydenzoin, p-diacetylbenzene, 4-aminobenzophenone, 4'-methoxyacetophenone, benzaldehyde, α-tetralone, 9-acetylphenanthrene, 2-acetylphenanthrene, 10-thioxanthenone, 3-acetylphenanthrene, 3-acetylindole, 9fluorenone, 1-indanone, 1,3,5-triacetylbenzene, thioxanthene-9-one, xanthene-9-one, 7-H-benz[de] anthracen-7-one, 1-naphthaldehyde, 4,4'-bis(dimethylamino) benzophenone, fluorene-9-one, 1'-acetonaphthone, 2'-acetonaphthone and 2,3-butanedione, etc.

Although the preferred means of curing is by means of electromagnetic radiation of wavelength of about 2,000–7,000 A. (because of simplicity, economy and convenience), the polyene-polythiol composition of the instant invention can be cured also by high energy ionizing irradiation. A preferred feature of the ionizing irradiation operation of the instant invention is treatment with high energy particle irradiation or by gamma-rays or X-rays. Irradiation employing particles in the instant invention includes the use of positive ions (e.g., protons alpha particles and deuterons and also electrons or neutrons). The charged particles may be accelerated to high speeds by means of various voltage gradient mechanisms such as a Van de Graaff generator, a cyclotron, a Cockroft Walton accelerator, a resonant cavity accelerator, a betatron, a G. E. resonant transformer, a synchrotron or the like. Furthermore, particle irradiation may also be supplied from cathode ray tubes, radioactive isotopes or an atomic pile. Gamma rays or X-rays may be obtained from radio isotopes (e.g., cobalt 60) or by particle bombardment or suitable target).

The dose rate for the irradiation operable to cure the composition in the instant invention is in the range 0.0001 to 200 megarads/second.

The amount of ionizing radiation which is employed in curing the photocurable encapsulating composition in the instant invention can vary between broad limits. Radiation dosages of less than a megarad up to 10 megarads or more for electrons are operable, preferaboy 0.02 to 5 megarads energy absorbed are employed. For gamma-rays or X-rays, radiation dosages in the range 0.0001 to 5.0 megarads energy absorbed are operable. The irradiation step is ordinarily performed under ambient temperature conditions but can be performed at temperatures ranging from below room temperature up to temperatures above which the substrates start to degrade.

When using ionizing radiation, the depth of penetration is dependent upon the density of the material to be penetrated. When the ionizing irradiation is in the form of electrons, 0.001 to 12 million electron volts(Mev) are usually employed. Where gamma rays or X-rays are employed, a range of 0.01 to 5.0 million electron volts is used. The aforesaid rang of voltage will allow penetration of aluminum in the range of 1–1,200 mils, of titanium in the range of 1–800 mils, of plastics in the rang of 1–4,000 mils or more and of wood, fabric and paper in the range of 2–8,000 mils.

The curing reaction can also be initiated by any free radical mechanism which dissociates or abstracts a hydrogen atom from the SH group (or accomplishes the equivalent thereof) and which is operable preferably under ambient conditions. Thus it is possible merely to expose the polyene and polythiol admixture with an electrical component therein to ambient conditions (oxygen from the air is the initiator) and obtain a cured solid elastomeric or resinous product over an extended period. Axo compounds or peroxides (with or without amine accelerators) which decompose at ambient conditions are also operable as free radical generating agents capable of curing the components of the instant invention to solid odorless elastomeric or resinous polymer products as will be shown hereinafter.

The compounding of the components prior to curing can be carried out in several ways. For example, the polyene, the polythiol and any other additives can be admixed in an inert atmosphere and charged to an oxygen free aerosol can, drum, tube, or cartridge for subsequent use.

Another useful method of compounding is to prepare in an ambient atmosphere by conventional mixing techniques but in the absence of actinic radiation a composition consisting of polyene, antioxidant (to inhibit spontaneous oxygen-initiated curing), a polythiol, a curing rate accelerator, and other inert additives. This composition can be stored in the dark for extended periods of time, but on exposure to actinic radiation (e.g., ultraviolet light, sunlight, etc.) will cure controllably and in a very short time period to solid polythioether products.

The curing period can be retarded or accelerated so that it can vary from less than 1 minute to 30 or more days. Conventional curing initiators or accelerators operable in the instant invention include, but are not limited to oxygen; peroxides; hydroperoxides; peracids; persulfates; azo compounds such as azobis-isovaleronitrile; ultraviolet light (with and without coagent sensitizers); high energy radiation such as X-rays, β-rays, electron beams, gamma radiation, and the like; ozone, oxidizing agents such as $PbO_2$ and cyclohexanone peroxide with dimethyl aniline. Conventional curing inhibitors or retarders operable in the instant invention include but are not limited to hydroquinone; p-tert-butyl catechol; 2,6-ditertbutyl-p-methylphenol; phenothiazine; N-phenyl-2-naphthylamine; inert gas atmospheres such as helium, argon, nitrogen, and carbon dioxide; vacuum; and the like.

The general procedure for potting or casting by the instant invention is to place the electrical components in the desired position in a container, pour in the liquid curable composition comprising polyene, polythiol and curing rate accelerator and then expose the composition to actinic radiation, e.g., UV light, for a time sufficient to form a solid, cured polythioether. Obviously high energy ionizing radiation from e.g., a Van de Graaff electron accelerator can be substituted for actinic radiation but is most instances the equipment cost is higher. In casting, the container is coated with a release agent, e.g., silicone oil to facillitate its removal after curing. In an encapsulating process, the electrical component is dipped in the aforesaid liquid curable composition and then the adhering conformal liquid composition is cured by UV light for a time sufficient to form a solid, cured polythioether covering over the desired portion of the electrical component. In using the instant invention in an enbedment, the article to be embedded is housed in a mold and a liquid curable composition comprising a polyene, polythiol and a free radical generator such as a peroxide with or without an amine accelerator is poured into the mold until it completely surrounds the article. After the composition is cured to a solid cured polythioether at ambient conditions the mold is removed. The same formulation is used in the impregnation of components containing coils or capacitor elements and in molding operations. If the mold is UV transparent then the formulation used for encapsulating and potting supra can be employed. The resultant cured polythioether products are preferably transparent allowing one to see the embedded article or component if desired. It is also possible to add heat-activatable color changing compounds such as the inorganic slats described in U.S. Pat. No. 3,445,291 to determine visually which component encased in the solid cured composition has failed. It is also operable in the instant invention when it is hard to heat-sink odd-shaped components such, as transformers, to add a thermally conductive dielectric e.g., beryllium oxide to the liquid curable composition in amounts ranging from 10 up to 100 percent by weight to assure good heat transfer.

The molecular weight of the polyenes of the instant invention can be measured by various conventional methods including solution viscosity, osmotic pressure and gel permeation chromatography. Additionally, the molecular weight can be calculated from the known molecular weight of the reactants.

The viscosity of the polyene and polythiols was measured on a Brookfield Viscometer at 30 or 70° C. in accord with the instructions therefor.

The following examples will aid in explaining, but should not be deemed as limiting, the instant invention. In all cases, unless otherwise noted, all parts and percentages are by weight.

PREPARATION OF POLYENES

EXAMPLE 1

One mole diglycidyl ether of Bisphenol A having a molecular weight in the range 370–384 and commercially available from Shell Chemical Company under the tradename "Epon 828" and 2 moles of diallyl amine were charged to a beaker at room temperature (25° C.). The reaction was continued for 18 hours with stirring during which time the exotherm and reaction temperature was maintained below 80° C. The thus formed allyl terminated liquid prepolymer will hereinafter be referred to as Prepolymer A.

EXAMPLE 2

One mole of a commercially available liquid polymeric diisocyanate sold under the tradename "Adiprene L 100" by E. I, duPont de Nemours & Co., was charged to a resin kettle equipped with a condenser, stirrer, thermometer and a gas inlet and outlet along with 4 grams of dibutyl tin dilaurate as a catalyst. Two moles of allyl alcohol was slowly added to the kettle during which time the exotherm and reaction temperature was maintained below 80° C. After the addition of the allyl aocohol was completed the reaction was continued for 15 hours at 70° C. under nitrogen. The thus formed allyl terminated liquid prepolymer will hereinafter be referred to as Prepolymer B.

EXAMPLE 3

One mole of commercially available tolylene diisocyanate was charged to resin kettle equipped with a condenser, stirrer, thermometer, and gas inlet and outlet. Two moles of the diallyl ether of trimethylpropane was slowly added to the kettle. After the addition was complete, 4.0 grams of dibutyl tine dilaurate as a catalyst was added to the kettle and the reaction was continued for 30 minutes at 70° C. under nitrogen. The thus formed allyl terminated liquid prepolymer will hereinafter be referred to as Prepolymer C.

EXAMPLE 4

One mole of commercially available polyethylene glycol having a molecular weight of 1,450 and a specific gravity of 1.21 was charged to a resin kettle maintained under nitrogen and equipped with a condenser, stirrer, thermometer and a gas inlet and outlet. 2.9 g. of dibutyl tin dilaurate as a catalyst was charged to the kettle along with 2 moles of tolylene-2,4-diisocyanate and 2 moles of allyl alcohol. The reaction was continued with stirring at 60° C. for 2 hours. Thereafter a vacuum of 1 mm. was applied for 2 hours at 60° C. to remove the excess alcohol. This $CH_2=CH-$ terminated prepolymer had a molecular weight of approximately 1,950 and will hereinafter be referred to as Prepolymer D.

EXAMPLE 5

1 mole of a commercially available polyoxypropylene glycol having a molecular weight of about 1958 and a hydroxyl number of 57.6 was charged to a resin kettle equipped with a condenser, stirrer, thermometer and a gas inlet and outlet. 4 g. of dibutyl tin dilaurate as a catalyst was added to the kettle along with 348 g. (2.0 moles) of tolylene-2,4diisocyanate and 116 g. (2 moles) of allyl alcohol. The reaction was carried out for 20 minutes at room temperature under nitrogen. Excess alcohol was stripped from the reaction kettle by vacuum over a 1 hour period. The thus formed $CH_2$ $CH-$ terminated liquid prepolymer had a molecular weight of approximately 2,400 and will hereinafter be referred to as Prepolymer E.

EXAMPLE 6

750 g. of a N-containing tetrol (hydroxyl functionality =four) available from Wyandotte Chemicals Corp. under the tradename "Tetronic Polyol 904" having a M.W. of 7,500 was placed in a reaction vessel heated at 110° C. The flask was maintained under vacuum for 1 hour. Then, under an atmosphere of nitrogen, 0.1 cc. dibutyl tin dilaurate was added and the flask was cooled to 50° C. Now 18.3 g. allyl isocyanate was added slowly, maintaining the temperature at about 95° C, for about 1 hour after the addition was completed. The thus formed polymeric polyene (i.e., Prepolymer F hereinafter) had a theoretical allyl functionality of 2.2, a theoretical hydroxyl functionality of 1.8, and a calculated molecular weight of about 7,683.

EXAMPLE 7

To a 1 liter resin kettle equipped with stirrer, thermometer, gas inlet and outlet and heated to a temperature of 50° C. was charged 610 g. (0.2 mole) of polytetramethylene ether glycol, commercially available from Quaker Oats Co. and having a hydroxyl number of 37.1 along with 0.3 g. dibutyl tin dilaurate. The temperature of the kettle was raised to 110° C. and the contents were freed of water under 1 millimeter vacuum for 1 hour. The resin kettle was cooled to 60° C. and the system was placed under a protective atmosphere of nitrogen throughout the remainder of the reaction. 25.2 g. of allyl isocyanate, (0.4 mole) was added dropwise to the kettle at such a rate as to maintain the temperature at 60° C. When the NCO content dropped to 0.54 mg./g., 1 mm. vacuum again was applied and the system was heated at 70° C. for 1 hour. The thus formed polymer product was a solid at room temperature but at 50° C. is clear and pourable. The polymer product had a viscosity of 1,800 centipoises at 70° C. as measured on a Brookfield Viscometer and an average molecular weight of approximately 3,200 and will be referred to hereinafter as Prepolymer G.

EXAMPLE 8

To a 1 liter four neck flask heated at 110° C. was charged 808 g. of polyester diol (having a molecular weight 3,232) sold under the tradename "RC Polyester S 101–35" by R. C. Division, Hooker Chemical Corp. and 0.1 cc. dibutyl tin dilaurate. The flask was maintained under vacuum at 110° C. for 1 hour. The flask was cooled to approximately 50° C. and with nitrogen passing through, a mixture of 10 g. of allyl alcohol and 60 g. of tolylene-2,4-diisocyanate was added via a dropping funnel at a moderate rate. The reaction was allowed to continue for 15 minutes. A maximum temperature of 90° C. was produced by the exothermic reaction. The polymeric product obtained was a solid at room temperature but liquid at 70° C. The product had an average molecular weight of approximately 10,500 and a viscosity of 270,000 centipoises at 70° C. and will be referred to hereinafter as Prepolymer H.

EXAMPLE 9

A transformer was placed in a UV transparent container and covered, except for lead wires, with a transparent curable liquid composition of a polyene i.e., Prepolymer A from Example 1, a polythiol i.e., pentaerythritol tetrakis ($\beta$-mercaptopropionate) in a 1:1 mole ratio and 0.1 parts of dibenzosuberone per 100 parts of the polyene/polythiol composition. The composition was exposed to a 275 watt Sylvania RS sun lamp at a surface intensity of 4,000 microwatts/cm.$^2$ for 5 minutes. The major spectral lines of this lamp are all above 3,000 A. A solid, cured, transparent polythioether casing covering the transformer resulted.

EXAMPLE 10

Example 9 was repeated except that the transparent curable liquid composition was Prepolymer B from Example 2, pentaerythritol tetrakis ($\beta$-mercaptopropionate) in a 1:0.5 mole ratio respectively and 0.75 parts of benzophenone per 100 parts of the polyene/polythiol composition. A solid, cured, transparent polythioether casing covering the transformer resulted.

EXAMPLE 11

Example 9 was repeated except that the transparent curable liquid composition was Prepolymer C from Example 3, pentaerythritol tetrakis (β-mercaptopropionate) in a 1:1.2 mole ratio respectively and 1.0 parts of benzophenone per 100 parts of the polyene/polythiol composition. A solid, cured, transparent casing covering the transformer resulted.

EXAMPLE 12

Example 9 was repeated except that the transparent curable liquid composition was Prepolymer D from Example 4, pentaerythritol tetrakis (β-mercaptopropionate) in a 1:0.5 mole ratio respectively and 1.5 parts of benzophenone per 100 parts of the polyene/polythiol composition. A solid, cured, transparent casing covering the transformer resulted.

EXAMPLE 13

Example 9 was repeated except that the transparent curable liquid composition was Prepolymer E from Example 5, pentaerythritol tetrakis (β-mercaptopropionate) in a 1:0.5 mole ratio respectively, 1.3 parts of a carbodiimide stabilizer sold under the tradename "Staboxol I" commercially available from Naftone, New York, New York and 0.5 parts of benzophenone per 100 parts of the polyene/polythiol composition. A solid cured, transparent casing covering the transformer resulted. This composition was shown to have outstanding durability when exposed to high humidity environments.

EXAMPLE 14

Example 9 was repeated except that the transparent curable liquid composition was Prepolymer F from Example 6. pentaerythritol etrakis (β-mercaptopropionate) in a 1:1 mole ratio respectively and 1.5 parts of benzophenone per 100 parts of the polyene/polythiol composition. A solid, cured, transparent casing covering the transformer resulted.

EXAMPLE 15

Example 9 was repeated except that the transparent curable liquid composition was poured at 50° C. and was Prepolymer G from Example 7, pentaerythritol tetrakis (β-mercaptoproptionate) in a 1:0.5 mole ratio respectively and 1.0 parts of benzophenone per 100 parts of the polyene/polythiol composition. A solid, cured, transparent casing covering the transformer resulted.

EXAMPLE 16

Example 9 was repeated at 70° C except that the transparent curable liquid composition was Prepolymer H from Example 8, pentaerythritol tetrakis (β-mercaptopropionate) in a 1:0.5 mole ratio respectively and 1.5 parts of benzophenone per 100 parts of the polyene/polythiol composition. A solid, cured, transparent encasing covering the transformer resulted.

The following example shows the use of a peroxide to cure the curable composition of the instant invention in an impregnation.

EXAMPLE 17

The terminals and leads of a transformer were impregnated with a curable liquid composition of an admixture of Prepolymer B from Example 2, pentaerythritol tetrakis (β-mercaptopropionate) in a 1:0.5 mole ratio respectively along with 0.3 parts of benzoyl peroxide and 0.6 parts dimethyl aniline per 100 parts of the polyene/polythiol composition. Within 3 minutes at ambient temperature, a cured, solid, transparent covering of the terminals and leads of the transformer resulted. Components containing coils and capacitor elements were also readily impregnated using same composition and procedure.

The following example shows the use of high energy ionizing radiation to encapsulate electrical components.

EXAMPLE 18

A line of capacitors excluding leads were encapsulated with a curable liquid composition of Prepolymer B from Example 2 and pentaerythritol tetrakis (β-mercaptopropionate) in a 2:1 mole ratio respectively. The coated line of capacitors (three sixteenths inch thick) were then irradiated from a 2 Mev Van de Graaff electron accelerator at a dose of 2.0 megarads delivered in a single pass under the electron accelerator. The pass rate was 18.4 inches/minute at a beam current of 195 microamperes, and a scan width of 12 inches at a distance of 5 inches from the beam window. A transparent, solid, cured, conformal encapsulant of the capacitors resulted.

EXAMPLE 19

Example 9 was repeated except that the container was coated with silicon oil prior to the addition of the transformer and the curable liquid composition. After the composition was exposed to UV light, the transformer and its solid cured transparent encapsulant was removed by hand from the container.

EXAMPLE 20

A plug-in type circuit board containing transistors, capacitors and resistors was placed between the two halves of a rigid polyvinyl chloride mold with the plug-in connection outside the mold. The mold was closed and a curable liquid composition of Prepolymer A from example, pentaerythritol tetrakis (β-mercaptopropionate) in a 1:1 mole ratio and 0.5 parts of dibenzosuberone per 100 parts of the polyene/polythiol composition was charged to the mold through its gate until the circuit board inside the mold was immersed in the composition and the mold was filled. The mold was then exposed to irradiation from two 275 watt Westinghouse sun lamps at a surface intensity of 4,000 microwatts/cm.$^2$. The major spectral lines of this lamp are all above 3,000 A. After a 10 minute exposure an integral mold of the circuit board in a solid, cured transparent polythioether encasing was obtained.

The thickness of the cured composition used as an encasing in the instant invention can vary between wide limits. Thickness ranging from one to 1 1,000 mils or more are operable. In encapsulating, thicknesses in the range 2–50 are ordinarily employed. Obviously the greater the thickness of the curable composition the longer the curing period. Curing periods of 1 second up to 60 minutes at ambient conditions are usually employed in the instant invention.

What is claimed is:

1. A method of encapsulating components which comprises covering the desired portions of said components with a composition comprising 2 to 98 parts by weight of a liquid polyene containing at least two reactive unsaturated carbon to carbon bonds per molecule and 98 to 2 parts by weight of a polythiol containing at least two thiol groups per molecule, the total combined functionality of (a) the reactive unsaturated carbon to carbon bonds per molecule in the polyene and (b) the thiol groups per molecule in the polythiol being greater than four, and curing said composition under ambient conditions in the presence of a free radical generator to form a solid cured polythioether covering the desired portions of said components.

2. The method according to claim 1 wherein 0.0005 to 50 percent by weight of said composition of a curing rate accelerator is added to the composition and the free radical generator is electromagnetic radiation in a wavelength range of 2,000–7,000 A.

3. The method according to claim 1 wherein the free radical generator is high energy ionizing radiation.

4. The method according to claim 1 wherein the free radical generator is an organic peroxide.

5. The method according to claim 1 wherein the components are electric, electronic or microelectronic.

6. The method according to claim 1 wherein the cured polythioether is transparent.

7. The method according to claim 1 wherein 10-100 percent by weight of the composition of beryllium oxide is added to the composition.

8. An article of manufacture comprising electric or electronic components encapsulated in a cured polythioether formed by the method of claim 1.

* * * * *